US005413733A

United States Patent [19]

Nicholson et al.

[11] Patent Number: 5,413,733

[45] Date of Patent: May 9, 1995

[54] AMIDOOXY PEROXYCARBOXYLIC ACIDS AND SULFONIMINE COMPLEX CATALYSTS

[75] Inventors: John R. Nicholson, Ramsey; Richard G. Gary, West New York, both of N.J.

[73] Assignee: Lever Brothers Company, Division of Conopco, Inc., New York, N.Y.

[21] Appl. No.: 97,150

[22] Filed: Jul. 26, 1993

[51] Int. Cl.[6] ........................ C01B 15/10; C11D 3/395

[52] U.S. Cl. .......................... 252/186.42; 252/186.26; 252/95

[58] Field of Search ...................... 252/186.33, 186.26, 252/186.42, 95

[56] References Cited

U.S. PATENT DOCUMENTS

| | | | |
|---|---|---|---|
| 4,626,373 | 12/1986 | Finch et al. | 252/96 |
| 4,642,198 | 2/1987 | Humphreys et al. | 252/94 |
| 4,728,455 | 3/1988 | Rerek | 252/99 |
| 4,992,194 | 2/1991 | Liberati et al. | 252/99 |
| 5,021,187 | 6/1991 | Harriott et al. | 252/186.38 |
| 5,041,232 | 8/1991 | Batal et al. | 252/94 |
| 5,114,606 | 5/1992 | van Vliet et al. | 252/103 |
| 5,114,611 | 5/1992 | van Kralingen | 252/186.33 |
| 5,153,161 | 10/1992 | Kerschner et al. | 502/167 |
| 5,194,416 | 3/1993 | Jureller et al. | 502/167 |
| 5,227,084 | 7/1993 | Martens et al. | 257/95 |
| 5,244,594 | 9/1993 | Favre et al. | 252/186.33 |
| 5,246,612 | 9/1993 | Van Dijk et al. | 252/102 |
| 5,246,621 | 9/1993 | Favre et al. | 252/186.33 |
| 5,292,447 | 3/1994 | Venturello et al. | 252/102 |

FOREIGN PATENT DOCUMENTS

| | | |
|---|---|---|
| 42939/89 | 5/1990 | Australia . |
| 347724 | 12/1989 | European Pat. Off. . |
| 349940 | 1/1990 | European Pat. Off. . |
| 435379 | 7/1991 | European Pat. Off. . |
| 90/14336 | 11/1990 | WIPO . |

OTHER PUBLICATIONS

J. Am. Chem. Soc. (Wieghardt et al.), 1988, vol. 110, pp. 7398–7411.

J. Chem. Soc., (Wieghardt et al.), 1988, pp. 1145–1146.

Copending applications: Kerschner et al., Ser. No. 07/900,861; Kerschner et al. 07/909,358; Kerschner et al., 07/942,574; Delwel, Ser. No. 07/978,554; Gary et al., Ser. No. 08/096,879; Nicholson et al., Ser. No. 08,096,877.

*Primary Examiner*—Richard D. Lovering
*Assistant Examiner*—Joseph D. Anthony
*Attorney, Agent, or Firm*—A. Kate Huffman

[57] ABSTRACT

A bleaching composition and method of using is provided wherein the composition comprises and effective amount for bleaching of an amido organic peroxyacid whose structure is:

$$\overset{O}{\overset{\|}{MOC}}-R-(R^1N)_n\overset{O}{\overset{\|}{C}}(NR^2)_m-R^3-\overset{O}{\overset{\|}{C}}OOM \qquad (I)$$

wherein R, $R^1$, $R^2$, $R^3$, M, n, and m are defined in the specification;

an effective amount of an oxygen transfer agent having a structure:

$$R^1R^2C{=}NSO_2R^3 \qquad (IV)$$

wherein $R^1$, $R^2$, and $R^3$ are as defined in the specification; and from about 5.0 to 50% by weight of a surfactant. The preferred pH range of the compositions of the invention is from 7 to about 10.

10 Claims, No Drawings

AMIDOOXY PEROXYCARBOXYLIC ACIDS AND SULFONIMINE COMPLEX CATALYSTS

FIELD OF THE INVENTION

The invention concerns novel amido peroxycarboxylic acids combined with catalysts which are sulfonimine complexes used as bleaches for stain removal.

BACKGROUND OF THE INVENTION

Organic peroxyacids have long been known for their excellent bleaching activity. For instance, U.S. Pat. No. 4,642,198 (Humphreys et al) describes a variety of water-insoluble organic peroxyacids intended for suspension in an aqueous, low pH liquid. The preferred peroxy material is 1,12-diperoxydodecanedioic acid (DPDA). Surfactants, both anionic and nonionic, are utilized as suspending agents. When formulated with 10% surfactant, DPDA exhibits good stability under storage conditions. When the surfactant level of the formulation is increased to 22%, a level typical for a heavy-duty laundry detergent, the half-life of the DPDA decreases dramatically. For example, U.S. Pat. No. 4,992,194 (Liberti et al) reports that at 40° C. the half-life of DPDA is only 1 to 2 weeks in a pH 4–4.5 heavy-duty laundry liquid.

EP 0 349 940 (Hoechst AG) describes a series of imido peroxyacids, chief among which is N-phthaloylamino peroxycaproic acid (PAP). Suspension of imidoperoxycarboxylic acids in an aqueous system is achieved through use of sodium alkylbenzene sulfonate as reported in EP 0 435 379 (Akzo N. V.). Related technology in EP 0 347 724 (Ausimont) discloses heterocyclic peracids such as N-acyl-piperidine percarboxylic acids. WO 90/14336 (Interox) discloses 6,6'-terephthal-di(amidoperoxyhexanoic) acid and 6,6'-fumaryl bis (amidoperoxyhexanoic) acid.

Oxygen-releasing materials have an important limitation, however, their activity is extremely temperature dependent. Temperatures in excess of 60° C. are normally required to achieve any bleach effectiveness in an aqueous wash system. The art has partially solved this problem through the use of activators. These activators, also known as bleach precursors or oxidation catalyst, react with oxygen releasing materials to generate more effective oxidizing species.

A variety of sulfonimine complexes used as oxidation catalysts have been described in U.S. Pat No. 5,047,163 (Batal et al.).

It has been surprisingly found that the bleaching activity of the organic peroxyacids having a percarboxylic and a carboxylic acid, or a salt functional unit, in combination with a sulfonimine catalyst is significantly improved under alkaline conditions.

It is thus an object of the present invention to provide novel peroxycarboxylic acids in combination with sulfonimine catalysts to provide an improved bleaching system and detergent composition containing such system.

It is another object of the present invention to improve the performance of the new peroxycarboxylic acids and sulfonimine catalysts bleaching system in highly alkaline detergent formulations.

A further object of the present invention is to provide a bleaching system which operates over a wide temperature range including those temperatures under 60° C.

Another object of the present invention is to provide bleach improvement through the combination of novel peroxycarboxylic acids and sulfonimine catalysts which are effective in relatively small amounts to provide stable compositions and to avoid substantial incremental cost.

A still further object of the present invention is to provide a method for bleaching stained surfaces such as clothes, household hard surfaces including sinks, toilets and the like, dishware and even dentures.

These and other objects will become apparent through the following description of the invention.

SUMMARY OF THE INVENTION

A bleaching composition is provided comprising:

i) an effective amount for bleaching of an amido organic peroxy acid whose structure includes a percarboxylic and a carboxylic acid or salt functional unit;

ii) from about 0.05 to about 10% of an oxygen transfer agent whose structure is:

$$R^1R^2C{=}NSO_2R^3 \qquad (IV)$$

wherein:

$R^1$ may be substituted or unsubstituted radical selected from the grouping consisting of hydrogen, phenyl, aryl, heterocyclic ring, alkyl and cycloalkyl radicals;

$R^2$ may be a substituted or unsubstituted radical selected from the group consisting of hydrogen, phenyl, aryl, heterocyclic ring, alkyl, cycloalkyl, $R^1C{=}NSO_2R^3$, nitro, halo, cyano, alkoxy, keto, carboxylic and carboalkoxy radicals;

$R^3$ may be a substituted or unsubstituted radical selected from the group consisting of phenyl, aryl, heterocyclic ring, alkyl, cycloalkyl, nitro, halo, and cyano radicals;

$R^1$ with $R^2$ and $R^2$ with $R^3$ may respectively together form a cycloalkyl, heterocyclic, and aromatic ring system; and iii) from about 0.5 to about 50% by weight of a surfactant, the composition having a pH of from 8 to 10.

A method of bleaching a substrate is also provided which comprises contacting the substrate with a bleaching composition comprising an effective amount of an amido organic peroxy acid whose structure includes a percarboxylic and a carboxylic acid or salt-functional unit; an effective amount of a sulfonimine; and from about 0.5 to about 50% by weight of a surfactant.

DESCRIPTION OF THE PREFERRED EMBODIMENTS

The present invention relates to a bleaching composition comprising an effective amount of a novel amidopercarboxylic acid having the formula:

$$MO\overset{\overset{O}{\|}}{C}-R-(R^1N)_n\overset{\overset{O}{\|}}{C}(NR^2)_m-R^3-\overset{\overset{O}{\|}}{C}OOM \qquad (I)$$

wherein:

R is selected from the group consisting of $C_1$–$C_{16}$ alkylene, $C_1$–$C_{16}$ cycloalkylene and $C_6$–$C_{12}$ arylene radicals;

$R^1$ is selected from the group consisting of $C_1$–$C_{16}$ cycloalkyl and $C_6$–$C_{12}$ aryl radicals;

$R^2$ is selected from the group consisting of hydrogen, $C_1$–$C_{16}$ alkyl, $C_1$–$C_{16}$ cycloalkyl and $C_6$–$C_{12}$ aryl radicals and a carbonyl radical that can form a ring together with R when R is arylene;

$R^3$ is selected from the group consisting of $C_1$–$C_{16}$ alkylene, $C_5$–$C_{12}$ cycloalkylene and $C_6$–$C_{12}$ arylene radicals;

n and m are integers whose sum is 1; and

M is selected from the group consisting of hydrogen, alkali metal, alkaline earth metal, ammonium and alkanolammonium cations and radicals.

Preferred compounds within Formula 1 include molecules having the structure:

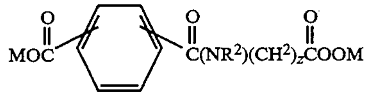

(II)

wherein:

z is an integer ranging from 1 to 12.

Especially preferred within the subcategory (II) are substances with the structure:

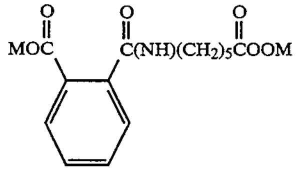

(III)

Sulfonimines within the subject bleaching compositions are those whose structure is:

$R^1R^2C{=}NSO_2R^3$ (IV)

wherein:

$R^1$ may be substituted or unsubstituted radicals selected from the group consisting of hydrogen, phenyl, aryl, heterocyclic ring, alkyl, and cycloalkyl radicals;

$R^2$ may be a substituted or unsubstituted radical selected from the group consisting of hydrogen, phenyl, aryl, heterocyclic ring, alkyl, cycloalkyl, $R^1C{=}NSO_2R^3$ nitro, halo, cyano, alkoxy, keto, carboxylic and carboalkoxy radicals;

$R^3$ may be a substituted or unsubstituted radical selected from the group consisting of phenyl, aryl, heterocyclic ring, alkyl, cycloalkyl, nitro, halo, and cyano radicals; and $R^1$ with $R^2$ and $R^2$ with $R^3$ may respectively together form a cycloalkyl, heterocyclic or aromatic ring system.

Most advantageous are sulfonimines having at least one of $R^1$, $R^2$, $R^3$ substituted with a water-solubilizing functional group. These functional groups may be selected from carboxylates, phosphates, phosphonates, sulfates, sulfonates in acid or salt form. Suitable salts include those whose counterions are selected from alkali metal, ammonium, and $C_2$–$C_6$ alkanolammonium anions.

Amine functional groups may also be incorporated into $R^1$, $R^2$, or $R^3$ to provide water-solubilizing of the sulfonimines. An example combining the amine and heterocyclic structure is that of pyridine.

A water-solubilizing functional group is one which renders the sulfonimines soluble to the extent of at least 2 mg/l, preferably at least 25 mg/l, optimally at least 250 mg/l in water at 25° C.

Heterocyclic rings according to this invention include cycloaliphatic and cycloaromatic type radicals incorporating an oxygen, sulfur and/or nitrogen atom within the ring system. Representative nitrogen heterocycles include pyridine, pyrrole, imidazole, triazole, tetrazole, morpholine, pyrrolidine, piperidine and piperazine. Suitable oxygen heterocycles include furan, tetrahydrofuran and dioxane. Sulfur heterocycles may include thiophene and tetrahydrothiophene. Among the various heterocycles, it has been found that those incorporating nitrogen are the most active.

The term "substituted" is defined in relation to $R^1$, $R^2$, $R^3$ as a substituent which is a nitro, halo, cyano, $C_1$–$C_{20}$ alkyl, $C_3$–$C_{20}$ cycloalkyl, amino, aminoalkyl, thioalkyl, sulfoalkyl, carboxyester, hydroxy, $C_1$–$C_{20}$ alkoxy, polyalkoxy and $C_1$–$C_{40}$ quaternary di- or trialkylammonium function.

Sulfonimine compounds useful within the invention are those described below wherein $R^1$ is hydrogen, $R^2$ is phenyl with an X substituent, and $R^3$ is phenyl with a Y substituent. Very often X and Y groups are water-solubilizing groups, most commonly being carboxylic acid or salts thereof. Representative structures are as follows:

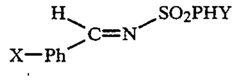

| | X | Y |
|---|---|---|
| SULF 1 | $4\text{-}CO_2H$ | 4-Cl |
| SULF 2 | $4\text{-}CO_2H$ | H |
| SULF 3 | 4-Cl | $4\text{-}CO_2H$ |
| SULF 4 | H | $4\text{-}CO_2H$ |
| SULF 5 | $4\text{-}CO_2H$ | $4\text{-}CO_2H$ |
| SULF 6 | $4\text{-}CO_2H$ | $3\text{-}NO_2$ |
| SULF 7 | 4-CN | $4\text{-}CO_2H$ |
| SULF 8 | 4-OMe | $4\text{-}CO_2H$ |
| SULF 9 | 3-OH | 4-Cl |

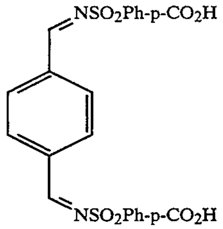

Illustrative of cycloaromatic and of heterocyclic nitrogen ring sulfonimines are the respective SULF 11 and SULF 12 whose structures are outlined below.

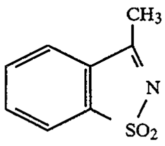

SULF 11

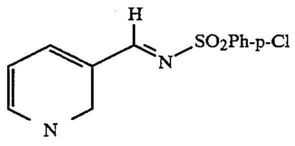

SULF 12

The following further compounds are illustrative of sulfonimines within the present invention.

N-Benzylidenebenzenesulfonamide

N-(4-Methylsulfinylbenzylidene)benzenesulfonamide

N-(4-Methylsulfonylbenzylidene)benzenesulfonamide
N-(3-Pyridinylmethylene)benzenesulfonamide
N-(4-Pyridinylmethylene)benzenesulfonamide
N-(2-Pyridinylmethylene)benzenesulfonamide
N-Benzylidene-3-pyridinesulfonamide 3-Trimethylammoniomethyl-1,2-benzisothiazole-1,1-dioxide chloride salt 1,2-benzisothiazole-1,1-dioxide
N-(N-Methyl-3-pyridinylmethylene)benzenesulfonamide chloride salt
N-(4-Trimethylammoniobenzylidene)benzenesulfonamide chloride salt
N-Benzylidene-4-trimethylammoniobenzenesulfonamide chloride salt
N-(4-Cholyloxycarbonylbenzylidene)benzenesulfonamide chloride salt
N-Benzylidene-4-cholyloxycarbonylbenzenesulfonamide chloride salt
N-(4-Sulfoethylcarbonylbenzylidene)benzenesulfonamide sodium salt
Methyl N-(p-tolylsulfonyl)iminoacetate
Phenylsulfonyliminoacetic acid
N-(α-Methylbenzylidene)benzenesulfonamide
N-Isopropylidenebenzenesulfonamide
N-Benzylidenemethanesulfonamide
N-(r-Carboxybenzylidene)methanesulfonamide
N-Benzylidenetrifluoromethanesulfonamide
N-(2,2,3,3,4,4,4-Heptafluorobutylidene)benzenesulfonamide
N-(4-Dimethylsulfoniumbenzylidene)benzenesulfonamide chloride salt
N-(2-Furfurylidene)-4-carboxybenzenesulfonamide
N-(2-Pyrrolylmethylene)benzenesulfonamide
N-(4-Phenoxycarbonylbenzylidene)benzenesulfonamide
N-(2,6-Dicarboxy-4-pyridinylmethylene)benzenesulfonamide disodium salt

DETERGENT COMPOSITION

When incorporated into a cleaning composition, the amidoperoxy acids of the present invention will range in concentration from about 1 to about 40%, preferably from about 1.5 to about 15%, optimally between about 2 and about 5% by weight.

A detergent formulation containing a peroxyacid bleach system according to the invention will usually also contain surface-active materials and detergency builders. When in liquid form, the surface-actives serve not only to clean but importantly function as structuring systems to suspend the water-insoluble amido or imido peroxyacids in water or any other solvent carrier. For heavy-duty laundry liquids, it is also important to include a pH adjusting system and advantageously a deflocculating polymer.

The surface-active material may be naturally derived, such as soap or a synthetic material selected from anionic, nonionic, amphoteric, zwitterionic, cationic actives and mixtures thereof. Many suitable actives are commercially available and are fully described in the literature, for example in "Surface Active Agents and Detergents", Volumes I and II, by Schwartz, Perry and Berch. The total level of the surface-active material may range up to 50% by weight, preferably being from about 1% to about 40% by weight of the composition, most preferably 4 to 25%.

Synthetic anionic surface-actives are usually water-soluble alkali metal salts of organic sulfates and sulfonates having alkyl radicals containing from about 8 to about 22 carbon atoms, the term alkyl being used to include the alkyl portion of higher aryl radicals.

Examples of suitable synthetic anionic detergent compounds are sodium and ammonium alkyl sulfates, especially those obtained by sulfating higher ($C_8$–$C_{18}$) alcohols produced for example from tallow or coconut oil; sodium and ammonium alkyl ($C_9$–$C_{20}$)benzene sulfonates, particularly sodium linear secondary alkyl ($C_{10}$–$C_{15}$)benzene sulfonates; sodium alkyl glyceryl ether sulfates, especially those ethers of the higher alcohols derived from tallow coconut oil and synthetic alcohols derived from petroleum; sodium coconut oil fatty acid monoglyceride sulfates and sulfonates; sodium and ammonium salts of sulfuric acid esters of higher ($C_9$–$C_{18}$) fatty alcohol-alkylene oxide, particularly ethylene oxide reaction products; the reaction products of fatty acids such as coconut fatty acids esterified with isethionic acid and neutralized with sodium hydroxide; sodium and ammonium salts of fatty acid amides of methyl taurine; alkane monosulfonates such as those derived by reacting alpha-olefins ($C_8$–$C_{20}$) with sodium bisulfite and those derived by reacting paraffins with $SO_2$ and $Cl_2$ and then hydrolyzing with a base to produce a random sulfonate; sodium and ammonium $C_7$–$C_{12}$ dialkyl sulfosuccinates; and olefinic sulfonates, which term is used to describe the material made by reacting olefins, particularly $C_{10}$–$C_{20}$ alpha-olefins, with $SO_3$ and then neutralizing and hydrolyzing the reaction product. The preferred anionic detergent compounds are sodium ($C_{11}$–$C_{15}$) alkylbenzene sulfonates; sodium ($C_{16}$–$C_{18}$) alkyl sulfates and sodium ($C_{16}$–$C_{18}$) alkyl ether sulfates.

Examples of suitable nonionic surface-active compounds which may be used preferably together with the anionic surface active compounds, include in particular, the reaction products of alkylene oxides, usually ethylene oxide, with alkyl ($C_6$–$C_{22}$) phenols, generally 2–25 EO, i.e. 2–25 units of ethylene oxide per molecule; the condensation products of aliphatic ($C_8$–$C_{18}$) primary or secondary linear or branched alcohols with ethylene oxide, generally 2–30 EO, and products made by condensation of ethylene oxide with the reaction products of propylene oxide and ethylene diamine. Other so-called nonionic surface-actives include alkyl polyglycosides, fatty alkylamides, long chain tertiary amine oxides, long chain tertiary phosphine oxides and dialkyl sulphoxides.

Amounts of amphoteric or zwitterionic surface-active compounds can also be used in the compositions of the invention but this is not normally desired owing to their relatively high cost. If any amphoteric or zwitterionic detergent compound is used, it is generally in small amounts in compositions based on the much more commonly used synthetic anionic and nonionic actives.

The detergent compositions of the invention will normally also contain a detergency builder. Builder materials may be selected from (1) calcium sequestrant materials, (2) precipitating materials, (3) calcium ion-exchange materials and (4) mixtures thereof.

In particular, the compositions of the invention may contain any one of the organic or inorganic builder materials, such as sodium or potassium tripolyphosphate, sodium or potassium pyrophosphate, sodium or potassium orthophosphate, sodium carbonate, the sodium salt of nitrilotriacetic acid, sodium citrate, carboxymethylmalonate, carboxymethyloxysuccinate, tartrate mono- and di-succinates, oxydisuccinate, crystalline or amorphous aluminosilicates and mixtures thereof.

Polycarboxylic homo- and copolymers may also be included as builders and to function as powder structurants or processing aids. Particularly preferred are polyacrylic acid (available under the trademark Acrysol from the Rohm and Haas Company) and acrylic-maleic acid copolymers (available under the trademark Sokalan from the BASF Corporation) and alkali metal or other salts thereof.

These builder materials may be present at a level of, for example, from 1 to 80% by weight, preferably from 10 to 60% by weight.

Upon dispersal in a wash water, the initial amount of peroxyacid should range in amount to yield anywhere from about 0.05 to about 250 ppm active oxygen per liter of water, preferably between about 1 to 50 ppm. Surfactant should be present in the wash water from about 0.05 to 1.0 grams per liter, preferably from 0.15 to 0.20 grams per liter. When present, the builder amount will range from about 0.1 to 3.0 grams per liter.

For automatic dishwashing detergent liquids, the bleaching effectiveness of the formulations is best achieved in a highly alkaline pH solution (i.e., 8 to 10).

In the preferred embodiment, the peroxygen peroxy acid is encapsulated in suitable materials to provide encapsulates which are stable in an alkaline environment. The preferred encapsulating material is a parafin wax as described in Lang et al.—U.S. Pat No. 5,200,236, herein incorporated by reference.

The following examples will more fully illustrate the embodiments of this invention. All parts, percentages and proportions referred to herein and in the appended claims are by weight unless otherwise indicated.

EXAMPLE 1

O-carboxybenzamidoperoxyhexanoic acid having the structure:

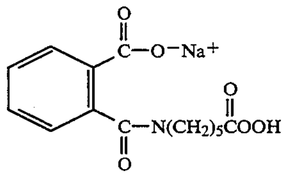

was prepared as follows. A 1500 ml glass beaker fitted with a magnetic stirrer was charged with 0.866 g (3.13 mmol) epsilon-phthalimidoperoxyhexanoic acid (PAP), 1 liter water, and 1.06 g (0.01 mol) sodium carbonate to give a pH of 10.0. The aqueous solution was stirred at 55° C. for 10 minutes. During this time, the pH of the reaction solution was kept constant by the use of sodium hydroxide. Upon completion of the experiment, the solution was analyzed for the presence of O-carboxybenzamidoperoxyhexanoic acid using NMR and UV spectroscopy.

O-carboxybenzamidoperoxyhexanoic acid is stable in D20 at pH 10.0, and has H1 resonances at 3.3 ppm, corresponding to the protons of the phenyl ring, and at 7.5 ppm, corresponding to the aliphatic N-alpha protons, relative to TMS. The related H1 resonances for epsilon-phthalimidoperoxyhexanoic acid (PAP) are centered at 3.7 ppm and 7.9 ppm, respectively. The percent yield was determined by comparing the relative heights of the H1 resonance lines for o-carboxybenzamidoperoxyhexanoic acid with those for epsilon-phthalimidoperoxyhexanoic acid (PAP). The percent yield of o-carboxybenzamidoperoxyhexanoic acid was determined to be >95%.

The UV spectrum of epsilon-phthalimidoperoxyhexanoic acid (PAP) shows an absorbance maximum at lambda=300 nm, while o-carboxybenzamidoperoxyhexanoic acid does not absorb at this wavelength. The concentration of o-carboxybenzamidoperoxyhexanoic acid in solution was calculated by subtracting the concentration of PAP measured in solution at lambda=300 nm from the concentration of PAP introduced at the start of the experiment (3.13 mmol). At the end of the experiment, >95% of the PAP introduced was converted to o-carboxybenzamidohexanoic acid.

EXAMPLE 2

The following automatic dishwashing formulation was prepared:

| | INGREDIENT | % BY WEIGHT |
|---|---|---|
| PREMIX 1 | Laponite[1] | 0.02 |
| | Carbopol 940[2] | 1.20 |
| | Deionized Water | (to 100%) |
| PREMIX 2 | Deionized Water | (to 100%) |
| | NaOH (50%) | 2.0 |
| | Glycerol | 4.0 |
| | Sodium Tetraborate | 2.7 |
| | Sodium Bicarbonate | 5.0 |
| | Sodium Carbonate | 5.0 |
| | Sodium Citrate ($2H_2O$) | 15.0 |
| PREMIX 3 | SLF-18[3] | 2.0 |

[1] A smectite clay supplied by Laport Industries of Widnes, Chesire, England.
[2] A polymer thickener with a molecular weight of about 4,000,000 supplied by B. F. Goodrich Co. of Cleveland, Ohio.
[3] A nonionic surfactant having a $C_{12}$ alkyl with 24 EOs supplied by Olin Corporation of Stamford, Connecticut.

The formulation was prepared by slowly adding the Carbopol 940 to the clay and deionized water to form Premix 1. Premix 2 was then prepared by combining the ingredients listed above. Premix 1 and 2 were mixed independently for 30–40 minutes until smooth. Premix 2 was poured into Premix 1 over 10 minutes and the resulting solution was stirred for 30 minutes. The nonionic surfactant (Premix 3) was added with stirring for five minutes and the formulation was stirred for 30–45 minutes until smooth.

4 grams of the formulation was placed in each of four beakers and deionized water was added to form a one liter solution. The pH of each of the four solutions was adjusted with either NaOH or HCL to pH values of 7–10.

EXAMPLE 3

0.25% of a sulfonimine having the structure:

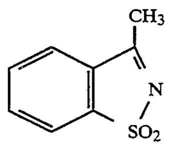

and 9.2 wt. % of o-carboxybenzamidoperoxyhexanoic acid were added to the samples of Example 2 to produce peroxyacid/catalyst compositions having pH values of 7–10. Control samples were also prepared without the presence of the catalyst.

The pH values of the compositions were adjusted by varying the amounts of sodium hydroxide and hydrochloric acid to achieve compositions having pH values of 7, 8, 9 and 10.

EXAMPLE 4

The bleaching performance of the o-carboxybenzamidoperoxyhexanoic acid and the sulfonimine catalyst compositions of the present invention in a pH range of from 7 to 10 was evaluated against BC-1 test cloths. The BC-1 cloths were washed in a terg-o-tometer for 30 minutes at 55° C. in a 1000 ml aqueous wash solution. The dosage of the peracid compound was 20 ppm active oxygen. Stain bleaching was measured reflectrometrically using a Colorgard/05 System Reflectometer.

Bleaching was indicated by an increase in reflectance, reported as ΔΔR. In general a ΔΔR of one unit is perceivable in a paired comparison while ΔΔR of two units is perceivable monadically. In reporting the reflectance change, the change in reflectance caused by general detergency has been accounted for Thus ΔΔR can actually be expressed as:

$$\Delta\Delta R = \Delta R\text{peracid} + \text{detergent} - \Delta\text{detergent}$$

where ΔR is the reflectance difference of the stained fabric after and before washing.

Compositions of Example 3 without the addition of the sulfonimine were used as a control.

It was observed that the bleaching performance of the compositions containing only the peroxyacid compound decreased progressively from pH 7 to pH 10 as illustrated in Table 1.

TABLE 1

| | ΔΔR Values corresponding to pH | | | |
|---|---|---|---|---|
| | 7 | 8 | 9 | 10 |
| uncatalyzed o-carboxybenzamido peroxyhexanoic acid | 7.4 | 6.4 | 4.6 | 2.7 |
| o-carboxybenzamidoperoxy hexanoic acid and sulfonimine catalyst | 13.9 | 14.3 | 14.7 | 13.9 |

In contrast, the bleaching compositions containing both o-carboxy benzamidoperoxyhexanoic acid and the sulfonimine catalyst were observed to be significantly better throughout the pH range of 7 to 10, (See Table 1). It was further observed that rather than decreasing in bleaching performance at the higher alkaline pHs, the compositions of the invention increased performance and remained stable in the range of pH 7 to 10.

EXAMPLE 5

For comparison, compositions of the prior art containing epsilon phthalimidoperoxyhexanoic acid (PAP) were prepared according to Examples 2 and 3. The bleaching performance of the prior art compositions was evaluated against common stains in the pH range of 7 to 10 as described in Example 4.

It was observed that the PAP containing compositions, both with and without the presence of the sulfonimine catalyst, exhibited good bleaching performance at pH 7 and 8. The bleaching performance of the uncatalyzed example, however, dropped dramatically at pH values 9 and 10 as illustrated in Table 2.

TABLE 2

| | ΔΔR values corresponding to pH | | | |
|---|---|---|---|---|
| | 7 | 8 | 9 | 10 |
| uncatalyzed epsilon-phthal imidoperoxyhexanoic acid | 25.4 | 25.4 | 17.8 | 2.6 |
| epsilon-phthalimidoperoxy hexanoic acid and sulfonimine catalyst | 24.9 | 25.3 | 19.9 | 13.9 |

Thus, the bleaching performance of the prior art peroxygen compound in highly alkaline formulations dramatically decreases in a pH range above 8. Moreover, the addition of the sulfonimine catalyst does not prevent the decrease in bleaching performance of the prior art compositions at a pH range above 8. In contrast, the bleaching performance of the catalyzed compositions of the invention was observed to remain stable in the same pH range of 8 to 10.

We claim:

1. A method for bleaching a substrate comprising applying to said substrate an effective amount to remove stain of a bleaching composition comprising:

(a) 1 to 40 wt. % of an amido organic peroxyacid having the Formula I $$MO\overset{O}{\overset{\|}{C}}-R-(R^1N)_n\overset{O}{\overset{\|}{C}}(NR^2)_m-R^3-\overset{O}{\overset{\|}{C}}OOM \quad (I)$$

wherein:

R is selected from the group consisting of $C_1$–$C_{16}$ alkylene, $C_1$–$C_{16}$ cycloalkylene and $C_6$–$C_{12}$ arylene radicals;

$R^1$ is selected from the group consisting of $C_1$–$C_{16}$ cycloalkyl and $C_6$–$C_{12}$ aryl radicals;

$R^2$ is selected from the group consisting of hydrogen, $C_1$–$C_{16}$ alkyl, $C_1$–$C_{16}$ cycloalkyl and $C_6$–$C_{12}$ aryl radicals and a carbonyl radical that can form a ring together with R when R is arylene;

$R^3$ is selected from the group consisting of $C_1$–$C_{16}$ alkylene, $C_5$–$C_{12}$ cycloalkylene and $C_6$–$C_{12}$ arylene radicals;

n and m are integers whose sum is 1;

M is selected from the group consisting of hydrogen, alkali metal, alkaline earth metal, ammonium and alkanolammonium cations and radicals; or a salt functional unit thereof;

(b) from about 0.05 to about 10% by weight of an oxygen transfer agent having a structure (IV)

$$R^1R^2C{=}NSO_2R^3 \quad (IV)$$

wherein:

$R^1$ may be a substituted or unsubstituted radical selected from the grouping consisting of hydrogen, phenyl, aryl, heterocyclic ring, alkyl and cycloalkyl radicals;

$R^2$ may be a substituted or unsubstituted radical selected from the group consisting of hydrogen, phenyl, aryl, heterocyclic ring, alkyl, cycloalkyl, $R^1C{=}NSO_2R^3$, nitro, halo, cyano, alkoxy, keto, carboxylic and carboalkoxy radicals;

$R^3$ may be a substituted or unsubstituted radical selected from the group consisting of phenyl, aryl, heterocyclic ring, alkyl, cycloalkyl, nitro, halo, and cyano radicals;

$R^1$ with $R^2$ and $R^2$ with $R^3$ may respectively together form a cycloalkyl, heterocyclic, and aromatic ring system; and (c) from about 0.5 to about 50 wt. % of a surfactant wherein the composition has a pH of from 7 to 10.

2. A method according to claim 1 wherein the peroxy acid has the structure:

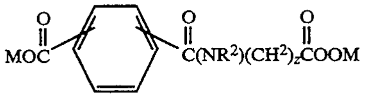

(II)

wherein Z is an integer ranging from 1 to 12 and M and $R^2$ are as described in claim 1.

3. A bleaching composition comprising (a) 1 to 40 wt. % of an amido organic peroxyacid having the Formula I $$MO\overset{\overset{O}{\|}}{C}-R-(R^1N)_n\overset{\overset{O}{\|}}{C}(NR^2)_m-R^3-\overset{\overset{O}{\|}}{C}OOM \qquad (I)$$

wherein:

R is selected from the group consisting of $C_1$–$C_{16}$ alkylene, $C_1$–$C_{16}$ cycloalkylene and $C_6$–$C_{12}$ arylene radicals;

$R^1$ is selected from the group consisting of $C_1$–$C_{16}$ cycloalkyl and $C_6$–$C_{12}$ aryl radicals;

$R^2$ is selected from the group consisting of hydrogen, $C_1$–$C_{16}$ alkyl, $C_1$–$C_{16}$ cycloalkyl and $C_6$–$C_{12}$ aryl radicals and a carbonyl radical that can form a ring together with R when R is arylene;

$R^3$ is selected from the group consisting of $C_1$–$C_{16}$ alkylene, $C_5$–$C_{12}$ cycloalkylene and $C_6$–$C_{12}$ arylene radicals;

n and m are integers whose sum is 1;

M is selected from the group consisting of hydrogen, alkali metal, alkaline earth metal, ammonium and alkanolammonium cations and radicals; or a salt functional unit thereof;

(b) from about 0.05 to about 10% by weight of an oxygen transfer agent having a structure (IV)

$$R^1R^2C{=}NSO_2R^3 \qquad (IV)$$

wherein:

$R^1$ may be a substituted or unsubstituted radical selected from the grouping consisting of hydrogen, phenyl, aryl, heterocyclic ring, alkyl and cycloalkyl radicals;

$R^2$ may be a substituted or unsubstituted radical selected from the group consisting of hydrogen, phenyl, aryl, heterocyclic ring, alkyl, cycloalkyl, $R^1C{=}NSO_2R^3$, nitro, halo, cyano, alkoxy, keto, carboxylic and carboalkoxy radicals;

$R^3$ may be a substituted or unsubstituted radical selected from the group consisting of phenyl, aryl, heterocyclic ring, alkyl, cycloalkyl, nitro, halo, and cyano radicals;

$R^1$ with $R^2$ and $R^2$ with $R^3$ may respectively together form a cycloalkyl, heterocyclic, and aromatic ring system; and (c) from about 0.5 to about 50 wt. % of a surfactant wherein the composition has a pH of from 7 to 10.

4. A bleaching composition according to claim 3 further comprising a builder selected from the group consisting of sodium citrate, oxydisuccinate, tartrate mono- and di-succinates.

5. A bleaching composition according to claim 3 wherein the peroxyacid compound has the structure:

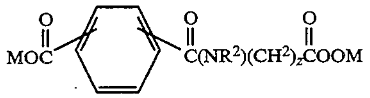

(II)

wherein:

z is an integer ranging from 1 to 12 and M and $R^2$ are as described in claim 3.

6. A bleaching composition according to claim 5 wherein the peroxyacid compound has the formula:

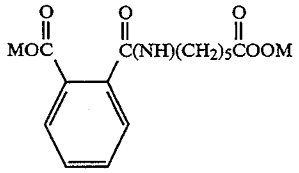

(III)

wherein:

M is as described in claim 5.

7. A bleaching composition according to claim 3 wherein at least one of $R^1$, $R^2$ and $R^3$ of the agent is substituted with a water solubilizing group.

8. A bleaching composition according to claim 7 wherein the formula water-solubilizing functional group is selected from the group consisting of carboxylic acid, phosphoric acid, phosphonic acid, sulfuric acid, sulfonic acid and salts thereof.

9. A bleaching composition according to claim 8 wherein the oxygen transfer agent is N-(4-carboxybenzylidene)-4-chloro-benzene sulfonamide.

10. A bleaching composition according to claim 8 wherein the oxygen transfer agent is N-(4-carboxybenzylidene)-benzene sulfonamide.

* * * * *